3,388,970
CHLORINE PENTAFLUORIDE PROCESS
Gene A. Hyde and Max M. Boudakian, Hamden, Conn., assignors to Olin Mathieson Chemical Corporation, New Haven, Conn., a corporation of Virginia
No Drawing. Filed Apr. 13, 1964, Ser. No. 360,169
6 Claims. (Cl. 23—205)

ABSTRACT OF THE DISCLOSURE

Chlorine pentafluoride is provided in high yield and purity by the reaction of alkali metal or alkaline earth metal chlorides with fluorine at an elevated temperature in a closed reaction vessel and recovery of the chlorine pentafluoride from the volatile reaction products.

This invention relates to a process for preparing chlorine pentafluoride, a useful fluorinating and oxidizing agent.

The ease of preparing halogen polyfluorides is known to increase with the increasing atomic weight of the non-fluorine halogen. Thus in this respect, the chlorine polyfluorides are much more difficult to prepare than, for example, the corresponding iodine polyfluorides. It has been recently reported by D. F. Smith in Science, 141, 1039 (1963), that $ClF_5$ was prepared by the reaction of a large molar excess of fluorine with chlorine trifluoride at high temperatures and with high fluorine pressures. However, pure $ClF_5$ was not obtained as a result of this process, since the product was contaminated with $ClF_3$ which could not be removed. Furthermore, both of the reactants involved in this process are gases, and handling problems are involved in view of their highly reactive nature. A large molar excess of fluorine (approximately 1300% over stoichiometric requirements) was employed in the process, and this is undesirable from an economic viewpoint.

The reactions of alkali metal chlorides with fluorine have been extensively studied, and a variety of reaction products have been reported in these reactions. However, $ClF_5$ has not been heretofore obtained in this manner. Moissan, Ann. Chim. Phys., [6], 24, 224 (1891) and Landau et al., Ind. Eng. Chem., 39, 281 (1947), have reported that when alkali metal chlorides, i.e., KCl and NaCl, are fluorinated at atmospheric pressure, the chlorides are converted to the corresponding fluorides with liberation of free chlorine. Similarly, Asprey et al., J. Am. Chem. Soc., 83, 2955 (1961) and Kelly et al., ibid., 85, 307 (1963), have reported that when NaCl and KCl are fluorinated at elevated pressures, NaF and $KClF_4$ are respectively obtained.

However, it has now been found that both alkali metal chlorides and alkaline earth metal chlorides can be fluorinated in a sealed reaction vessel under controlled experimental conditions to provide chlorine pentafluoride in high yield and purity. The process disclosed herein proceeds in accordance with the following equations wherein, for example, potassium chloride and barium chloride are utilized as the required chlorides.

$$KCl + 3F_2 \rightarrow ClF_5 + KF$$
$$BaCl_2 + 6F_2 \rightarrow 2ClF_5 + BaF_2$$

Chlorine pentafluoride prepared in accordance with this invention is not contaminated with impurities such as $ClF_3$, and the necessity for tedious and difficult purification procedures has been obviated. The use of a solid chloride in the process eliminates some of the handling problems involved in the reaction of two corrosive gaseous reactants. The process described herein is also attractive economically, since the alkali metal and alkaline earth metal chlorides are cheap and available reactants.

Although any of the alkali metal chlorides may be used in the preparation of chlorine pentafluoride by the process of this invention, it is preferred to use sodium and potassium chlorides. Similarly, any of the alkaline earth metal chlorides may be employed, but preferably barium and calcium chlorides are advantageously utilized. It has been found that barium chloride in particular can be fluorinated to provide chlorine pentafluoride in good yield by the process disclosed herein.

Chlorine pentafluoride prepared by this process can be obtained at reaction temperatures of from about 100° C. to about 300° C. However, at the lower end of this temperature range reaction rates are appreciably slower. At the upper end of this range, equipment problems, notably those concerned with corrosion, are increased. Therefore, it is preferred to utilized a temperature range of 150°–250° C. in the practice of this invention.

The chlorine pentafluoride may be obtained by reacting the chlorides with a stoichiometric quantity of fluorine. However, the reaction proceeds at a faster rate when an excess of fluorine is utilized, and preferably at least a 10% molar excess of fluorine over the required stoichiometric quantity should be employed. Thus in the fluorination of an alkali metal chloride, it is preferred to use at least 3.3 moles of fluorine per mole of chloride reactant. Up to a 300% molar excess of fluorine has been used in the practice of this invention, and of course unreacted fluorine can be recovered. The use of even higher molar amounts of fluorine is not detrimental, but recovery problems are increased with such large amounts.

Since the fluorinations described herein must be carried out in a sealed reaction vessel, the reactions are performed at elevated pressures. However, these pressures vary widely depending upon such factors as the size of the reaction vessel, reaction temperatures and molar ratios of reactants.

After the fluorination period is completed, isolation of the desired chlorine pentafluoride can be conveniently performed. For example, the volatile reaction products are easily separated from residual solids (mostly alkali metal and alkaline earth metal fluorides). Then the $ClF_5$ is isolated from other volatile materials, such as excess fluorine, by passing the gases through a series of cooling and condensing towers or columns or by other similar procedures.

The following examples will serve to illustrate the preparation of chlorine pentafluoride in accordance with the process of this invention.

Example 1

Into a one liter stainless steel cylinder was placed 15.0 g. (0.2038 mole) of potassium chloride. The cylinder was attached to a vacuum line, and 65.0 g. (1.7105 moles) of fluorine was condensed at −196° C. into the cylinder. The cylinder was warmed to room temperature, placed in an oil bath and heated at 150° C. for 63.5 hours. Excess fluorine was removed by cooling the cylinder to −134° C.; chlorine pentafluoride solidifies at this temperature while the fluorine can be transferred to a storage cylinder cooled to −196° C. The chlorine pentafluoride was then transferred to a weighed storage cylinder, and 21.5 g. of this material was thus collected. Based on the amount of potassium chloride employed, an 80.1% yield of $ClF_5$ was obtained. X-ray analysis of the solid residue (16.0 g.) revealed the presence of only KF and $KHF_2$; no KCl was found.

The infrared spectrum of the gaseous product was examined, and pronounced spectral bands at 730 cm.$^{-1}$ and 785 cm.$^{-1}$ were found. This is in close agreement with the values disclosed for $ClF_5$ by Smith, supra.

Nuclear magnetic resonance analysis also confirmed that the $ClF_5$ had been isolated.

Theory for $ClF_5$: 130.4. Found: 126.0. Molecular weight by vapor density procedure.

Example 2

Using the procedure of Example 1, 18.31 g. (0.25 mole) of potassium chloride was reacted with 94.5 g. (2.49 moles) of fluorine for eight hours at 200° C. Again, a yield of 82% of chlorine pentafluoride was obtained.

Example 3

A mixture of sodium chloride (0.0151 mole) and fluorine (0.1638 mole) was successively heated at 150° C. (550 p.s.i.) for 16.5 hours and 240° C. (675 p.s.i.) for 5 hours in a 150 ml. Monel cylinder. The desired chlorine pentafluoride was obtained in 56% yield, and the infrared spectrum of the gaseous product was identical to the spectrum obtained in Example 1.

What is claimed is:

1. A process for providing chlorine pentafluoride which comprises reacting a compound selected from the class consisting of alkali metal chlorides and alkaline earth metal chlorides with fluorine in a sealed reaction vessel at a temperature of about 100° C. to about 300° C. to provide a reaction mixture of solid and gaseous materials and isolating said chlorine pentafluoride from said reaction mixture.

2. The process of claim 1 wherein said isolation procedure comprises separating said solid material from said gaseous material, cooling said gaseous material below the freezing point of chlorine pentafluoride to provide solid chlorine pentafluoride, and separating said solid chlorine pentafluoride from remaining gases.

3. The process of claim 1 wherein said isolation procedure comprises cooling said reaction mixture below the freezing point of chlorine pentafluoride, separating gaseous materials from solid materials at said reduced temperature, and distilling chlorine pentafluoride from remaining solid material.

4. A process for providing chlorine pentafluoride which comprises reacting an alkali metal chloride with fluorine in an amount of at least a 10% molar excess over the required stoichiometric quantity in a sealed reaction vessel at a temperature of about 100° C. to about 300° C. to provide a reaction mixture of solid and gaseous materials, cooling said reaction mixture below the freezing point of chlorine pentafluoride, separating gaseous materials from solid materials at said reduced temperature, and distilling chlorine pentafluoride from remaining solid material.

5. The process of claim 4 wherein potassium chloride is employed as the alkali metal chloride.

6. The process of claim 4 wherein a preferred reaction temperature range of 150°–250° C. is employed.

References Cited

Kelly, Post, and Mason: "Reaction Between Fluorine and Alkali Metal Halides at Elevated Pressure and Temperature," J. Am. Chem. Soc., vol. 85, pp. 307–308 (1963).

OSCAR R. VERTIZ, *Primary Examiner.*

CARL D. QUARFORTH, BENJAMIN R. PADGETT, *Examiners.*

G. T. OZAKI, A. J. STEINER, *Assistant Examiners.*